(12) United States Patent
Gokan et al.

(10) Patent No.: US 8,490,768 B2
(45) Date of Patent: Jul. 23, 2013

(54) MULTI-PLATE CLUTCH SYSTEM

(75) Inventors: Yoshitsugu Gokan, Saitama (JP); Jun Miyazaki, Saitama (JP); Yoshinobu Shiomi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 365 days.

(21) Appl. No.: 12/885,079

(22) Filed: Sep. 17, 2010

(65) Prior Publication Data
US 2011/0073432 A1 Mar. 31, 2011

(30) Foreign Application Priority Data
Sep. 30, 2009 (JP) .................................. 2009-227683

(51) Int. Cl.
*F16D 13/54* (2006.01)
*F16D 13/74* (2006.01)
*F16D 43/21* (2006.01)

(52) U.S. Cl.
USPC ... 192/70.23; 192/54.5; 192/56.6; 192/113.5; 192/93 A

(58) Field of Classification Search
USPC ............. 192/70.23, 89.21, 113.5, 54.5, 93 A, 192/56.6
See application file for complete search history.

(56) References Cited

U.S. PATENT DOCUMENTS

| 2008/0029332 A1 | 2/2008 | Gokan et al. | |
| 2008/0099298 A1* | 5/2008 | Yoshinaga et al. | 192/70.14 |
| 2009/0321212 A1* | 12/2009 | Gokan et al. | 192/70.23 |
| 2011/0073429 A1* | 3/2011 | Gokan et al. | 192/54.5 |

FOREIGN PATENT DOCUMENTS

JP 2008-38954 A 2/2008

* cited by examiner

*Primary Examiner* — Richard M. Lorence
*Assistant Examiner* — Lillian Nguyen
(74) *Attorney, Agent, or Firm* — Birch, Stewart, Kolasch & Birch, LLP

(57) ABSTRACT

A pressure plate is movable in an axial direction to cause multiple driving friction plates and driven friction plates to come in pressure contact with each other. The pressure plate is biased by a clutch spring in a direction to bring the driving friction plates and the driven friction plates in pressure contact with each other. When acceleration torque is changed, an assist mechanism increases the pressure-contact force of the pressure plate. A pressure plate and a clutch inner are connected together and are capable of being separated from each other in an axial direction. When an assist mechanism increases a pressure-contact force of the pressure plate, the pressure plate is moved in a direction to bring driving and driven friction plates into pressure contact with each other, while the clutch inner is moved relative to the pressure plate in the same direction so as to be detached from the pressure plate.

17 Claims, 7 Drawing Sheets

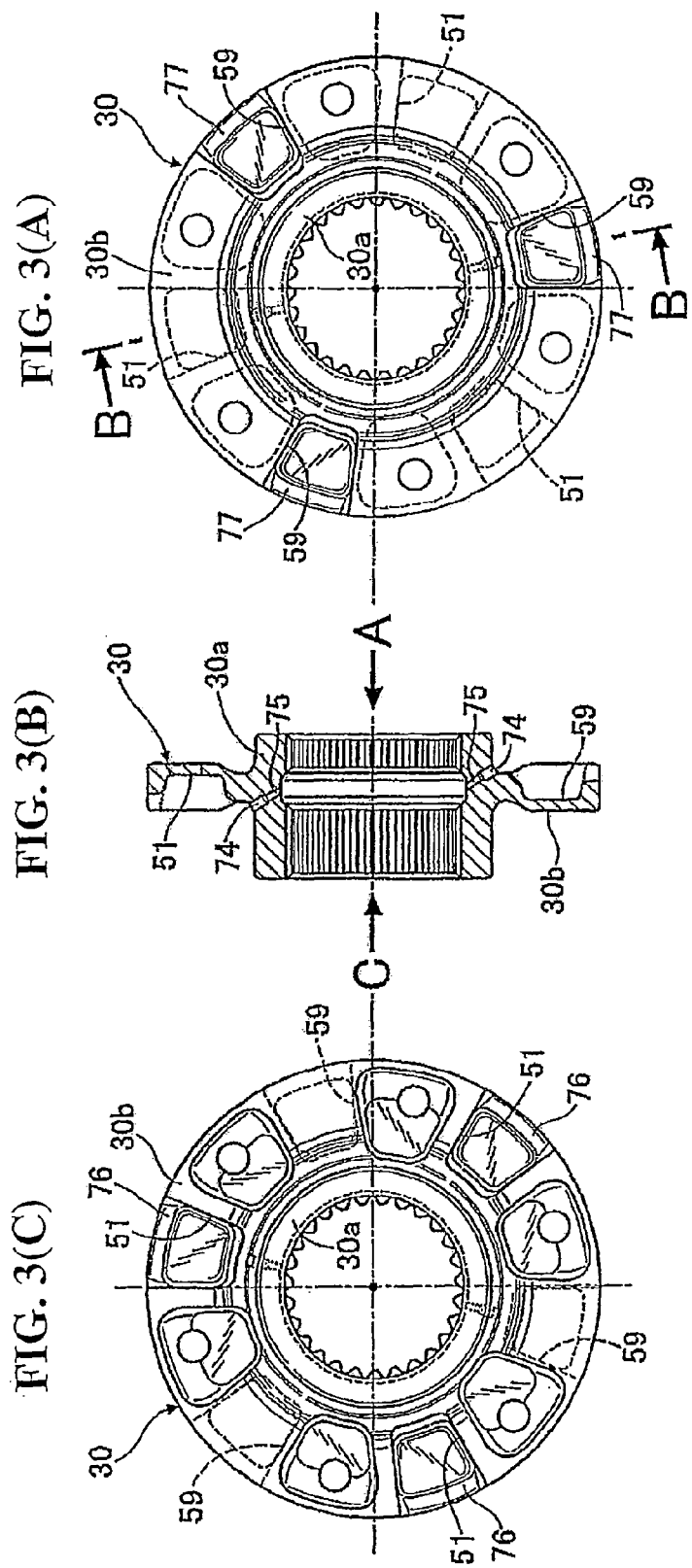

MULTI-PLATE CLUTCH SYSTEM

CROSS-REFERENCE TO RELATED APPLICATIONS

This application claims priority under 35 U.S.C. §119(a) to Application No. 2009-227683, filed in Japan on Sep. 30, 2009, the entirety of which is expressly incorporated herein by reference.

BACKGROUND OF THE INVENTION

1. Field of the Invention

The present invention relates to a multi-plate clutch system including: a clutch outer connected to an input member; a clutch inner connected to an output member; multiple driving friction plates engaged with the clutch outer in such a way as to be movable in an axial direction, and to be unrotatable relative to the clutch outer; multiple driven friction plates interleaved with the driving friction plates, the driven friction plates being engaged with the clutch inner in such a way as to be movable in the axial direction and to be unrotatable relative to the clutch inner; a pressure plate movable in the axial direction in order to cause the driving friction plates and the driven friction plates to frictionally engage with each other by bringing the driving friction plates and the driven friction plates into pressure contact with each other; a clutch spring for biasing the pressure plate in a direction in which the pressure plate brings the driving friction plates and the driven friction plates into pressure contact with each other; and at least one of an assist mechanism and a slipper mechanism, the assist mechanism being configured to increase a pressure-contact force of the pressure plate when acceleration torque is changed, the slipper mechanism being configured to decrease the pressure-contact force of the pressure plate when deceleration torque is changed.

2. Description of Background Art

Japanese Patent Application No. 2008-38954 discloses a multi-clutch system, which is designed to increase a pressure-contact force between driving friction plates and driven friction plates in such a way that: when acceleration torque is changed, an assist mechanism retracts a clutch inner; and thereby, in addition to a biasing force exerted on the clutch inner by a clutch spring, the retracting force is caused to work on the pressure plate.

In the multi-plate clutch system disclosed by Japanese Patent Application No. 2008-38954, however, the pressure plate is unitarily formed with the clutch inner. For this reason, the retracting force exerted on the clutch inner from the assist mechanism works on the pressure plate as well, and the pressure-contact force between the driving friction plates and the driven friction plates accordingly increases. At this time, the biasing force produced by the clutch spring and the retracting force produced by the assist mechanism additively work at almost the same timing. This may make the pressure plate move abruptly. As a result, the clutch connection may be rough.

SUMMARY OF THE INVENTION

The present invention has been made with the above-mentioned situation taken into consideration. An object of the present invention is to provide a multi-plate clutch system which is capable of performing an appropriate clutch connection while avoiding a rough clutch connection.

In order to achieve the above object, a first aspect of the present invention is a multi-plate clutch system including: a clutch outer connected to an input member; a clutch inner connected to an output member; a plurality of driving friction plates engaged with the clutch outer in such a way as to be movable in an axial direction and to be unrotatable relative to the clutch outer; a plurality of driven friction plates interleaved with the driving friction plates, the driven friction plates being engaged with the clutch inner in such a way as to be movable in the axial direction and to be unrotatable relative to the clutch inner; a pressure plate movable in the axial direction in order to cause the driving friction plates and the driven friction plates to frictionally engage with each other by bringing the driving friction plates and the driven friction plates into pressure contact with each other; a clutch spring for biasing the pressure plate in a direction in which the pressure plate brings the driving friction plates and the driven friction plates into pressure contact with each other; and an assist mechanism configured to increase a pressure-contact force of the pressure plate when acceleration torque is changed, the multi-plate clutch system characterized in that the clutch inner movable in the axial direction of the output member and the pressure plate which is a member different from the clutch inner are connected together to be unrotatable relative to each other and to be capable of being separated from each other in the axial direction in such a way that, when the assist mechanism increases the pressure-contact force of the pressure plate, the pressure plate is moved in a direction to bring the driving friction plates and the driven friction plates into pressure contact with each other while the clutch inner is moved relative to the pressure plate in the same direction in such a way as to be detached from the pressure plate.

According to a second aspect of the present invention, a slipper mechanism, that decreases the pressure-contact force produced by the pressure plate when deceleration torque is changed, is installed between the output member and the clutch inner in such a way that, while operating, the slipper mechanism moves the pressure plate in a direction in which the pressure plate decreases the pressure-contact force between the driving friction plates and the driven friction plates with the clutch inner being in intimate contact with the pressure plate.

According to a third aspect of the present invention, the assist mechanism includes: a spring configured to exert a spring force for biasing the clutch inner against a spring force of the clutch spring; and a cam mechanism configured to forcedly move the clutch inner against the biasing force of the spring to increase the pressure-contact force produced by the pressure plate when the acceleration torque is changed.

According to a fourth aspect of the present invention, the clutch inner includes an engagement cylinder part engaging the driven friction plates with an outer periphery of the engagement cylinder part thereof, an insertion cylinder part coaxially inserted in the engagement cylinder part is provided to the pressure plate, a plurality of groove forming projecting parts in which spline grooves are respectively formed are provided to one of an inner periphery of the engagement cylinder part and an outer periphery of the insertion cylinder part, and a plurality of spline projecting parts engaged with the respective spline grooves are provided to the other of the inner periphery of the engagement cylinder part and the outer periphery of the insertion cylinder part.

According to a fifth aspect of the present invention, the clutch inner and the pressure plate are provided with flat abutment parts extending along planes orthogonal to axes of the clutch inner and the pressure plate, respectively, in such a way that the flat abutment parts are in contact with each other when the clutch inner is brought into intimate contact with the pressure plate.

According to a sixth aspect of the present invention, a plurality of groove forming projecting parts in which spline grooves are respectively formed are provided to one of the clutch inner and the pressure plate, a plurality of spline projecting parts engaged with the respective spline grooves are provided to the other of the clutch inner and the pressure plate, and the abutment parts are provided in such a way as to be unitarily continuous to the groove forming projecting parts and the spline projecting parts to extend inward from the groove forming projecting parts and the spline projecting parts in a radial direction.

According to a seventh aspect of the present invention, a first oil passage for guiding oil to an engagement area between the spline grooves and the spline projecting parts is provided in the pressure plate in such a way as to penetrate the insertion cylinder part in a radial direction.

According to an eighth aspect of the present invention, a second oil passage for guiding oil to an engagement area between the spline grooves and the spline projecting parts is provided in the pressure plate in such a way as to penetrate the insertion cylinder part in the axial direction.

According to a ninth aspect of the present invention, sliding-contact surfaces are respectively provided to the clutch inner and the pressure plate in such a way as to be in sliding contact with each other, the sliding-contact surfaces being continuous to inner ends of the two abutment parts extending in the radial directions of the clutch inner and the pressure plate, the sliding-contact surfaces each being formed in the shape of an arc about a center axis line of the clutch inner.

According to a tenth aspect of the present invention, spaces are formed between the spline projecting parts and one of an inner periphery of an engagement cylinder part and an outer periphery of an insertion cylinder part, as well as between the groove forming projecting parts and the other of the inner periphery of the engagement cylinder part and the outer periphery of the insertion cylinder part, respectively.

It should be noted that a main shaft 11 of an embodiment corresponds to the output member according to the present invention, and a primary driven gear 16 corresponds to the input member according to the present invention.

According to the first aspect of the present invention, the clutch inner and the pressure plate, which is a member different from the clutch inner, are connected together to be unrotatable relative to each other and to be capable of being separated from each other in the axial direction in such a way that, when the assist mechanism increases the pressure-contact force of the pressure plate, the pressure plate is moved in the direction to bring the driving friction plates and the driven friction plates into pressure contact with each other while the clutch inner is moved relative to the pressure plate in the same direction in such a way as to be detached from the pressure plate. For this reason, even if the biasing force of the clutch spring and the retracting force of the assist mechanism act at almost the same time, these forces can be prevented from directly working on the pressure plate. This avoids an abrupt clutch connection, and accordingly makes it possible to achieve an appropriate clutch connection.

According to the second aspect of the present invention, the slipper mechanism, which moves the pressure plate in the direction in which the pressure plate decreases the pressure-contact force between the driving friction plates and the driven friction plates with the clutch inner being in intimate contact with the pressure plate, is installed between the output member and the clutch inner. For this reason, when the slipper mechanism reduces the pressure-contact force produced by the pressure plate in response to the change in the deceleration torque, back torque can be blocked instantaneously. Thereby, when assisted, an appropriate clutch connection can be achieved, and the back torque limiter capability can be secured as before.

According to the third aspect of the present invention, the assist mechanism includes: the spring configured to exert the spring force for biasing the clutch inner against the spring force of the clutch spring; and the cam mechanism configured to forcedly move the clutch inner against the biasing force of the spring when the acceleration torque is changed. This realizes the structure in which, when assisted, the spring load of the spring opposed to the clutch spring is reduced. Thereby, the substantial spring load of the clutch spring is increased, and the pressure-contact force is thus increased. Accordingly, since the biasing force of the clutch spring can be increased gradually, a smooth clutch connection can be realized.

According to the fourth aspect of the present invention, the structure is realized in which the outer periphery of the insertion cylinder part provided to the pressure plate is spline-engaged with the inner periphery of the engagement cylinder part included in the clutch inner in such a way that the insertion cylinder part is coaxially inserted in the engagement cylinder part. This enables the clutch inner and the pressure plate to be spline-engaged with each other while avoiding the clutch inner from increasing in size in the axial direction without adversely affecting the area of engagement of the driven friction plates with the outer periphery of the engagement cylinder part.

According to the fifth aspect of the present invention, the clutch inner and the pressure plate are provided with the flat abutment parts extending along the planes orthogonal to the axes of the clutch inner and the pressure plate, respectively, in such a way that the flat abutment parts are capable of being brought into intimate contact with each other. This makes it possible to decrease the abutment pressure by receiving the load by the flat surfaces when the clutch inner and the pressure plate are brought into intimate contact with each other, and accordingly to secure the rigidities of the abutment parts.

According to the sixth aspect of the present invention, the multiple spline projecting parts provided to the other of the clutch inner and the pressure plate are engaged with the spline grooves formed in the multiple groove forming projecting parts provided to the one of the clutch inner and the pressure plate, respectively. In addition, the abutment parts extend inward in the radial direction from the groove forming projecting parts and the spline projecting parts. This makes it possible to reinforce the groove forming projecting parts and the spline projecting parts by thickening the perimeters of the groove forming projecting parts and the spline projecting parts.

According to the seventh aspect of the present invention, the first oil passage penetrating the insertion cylinder part in the radial direction is provided in the pressure plate in order to guide oil to the engagement area between the spline grooves and the spline projecting parts. For this reason, the slidability of the spline engagement area can be enhanced by supplying oil to the spline engagement area.

According to the eighth aspect of the present invention, the second oil passage extending in the axial direction is provided in the pressure plate in order to guide oil to the engagement area between the spline grooves and the spline projecting parts. This makes it possible to enhance the slidability of the spline engagement area by supplying the oil to the spline engagement area in the longitudinal direction of the spline grooves and the spline protruding parts.

According to the ninth aspect of the present invention, the arc-shaped sliding-contact surfaces continuing to the inner ends of the two abutment parts extending in the radial directions of the clutch inner and the pressure plate are provided to the clutch inner and the pressure plate, respectively. In addition, the sliding-contact surfaces are in sliding contact with each other. This makes the displacement of the axes of the clutch inner and the pressure plate less likely to occur, and accordingly makes it possible to make the slide in the spline engagement area far smoother.

According to the tenth aspect of the present invention, the spaces are formed between the spline projecting parts and the one of the inner periphery of the engagement cylinder part and the outer periphery of the insertion cylinder part, as well as between the groove forming projecting parts and the other of the inner periphery of the engagement cylinder part and the outer periphery of the insertion cylinder part. For this reason, the sliding contact between the sliding-contact surfaces prevents the displacement of the axes of the clutch inner and the pressure plate, and inhibits increase in the area of the slide in the spline engagement area. Furthermore, the use of the spaces as passages through which to flow oil can enhance the slidability and lubricity in the spline engagement area.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3(A) to 3(C) are views of a center cam plate, respectively showing a right side in FIG. 3(A), a longitudinal cross section in FIG. 3(B), and a left side in FIG. 3(C);

DETAILED DESCRIPTION OF THE PREFERRED EMBODIMENTS

Figure 1:
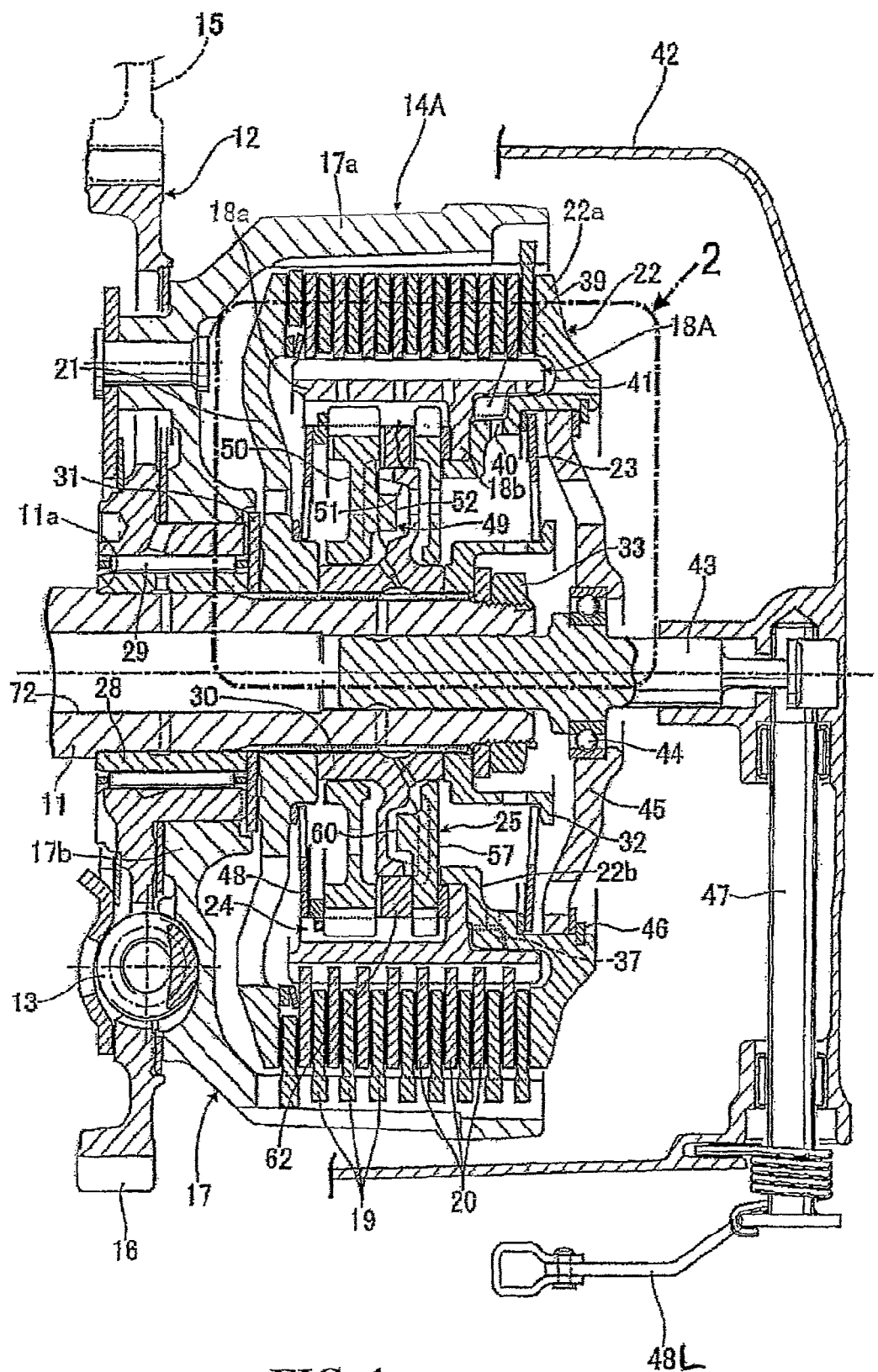
FIG. 1 is a longitudinal cross sectional view of a multi-plate clutch system according to Example 1.

The present invention will now be described with reference to the accompanying drawings, wherein the same reference numerals have been used to identify the same or similar elements throughout the several views. Descriptions will be hereinafter provided for embodiments of the present invention by referring to the attached drawings.

Example 1

Example 1 of the present invention will be described by referring to FIGS. 1 to 5. First of all, in FIG. 1, a primary speed reducing device 12, a damper spring 13 and a multi-plate clutch system 14A are installed between a crank shaft (not illustrated) of an engine mounted on, for example, a motorcycle and a main shaft 11 of a gear transmission system (not illustrated). The primary speed reducing device 12 includes: a primary driving gear 15 provided to the crank shaft; and a primary driven gear 16 in mesh with the primary driving gear 15. The primary driven gear 16 is supported by the main shaft 11 in such a way that the primary driven gear 16 is rotatable relative to the main shaft 11.

Figure 2:
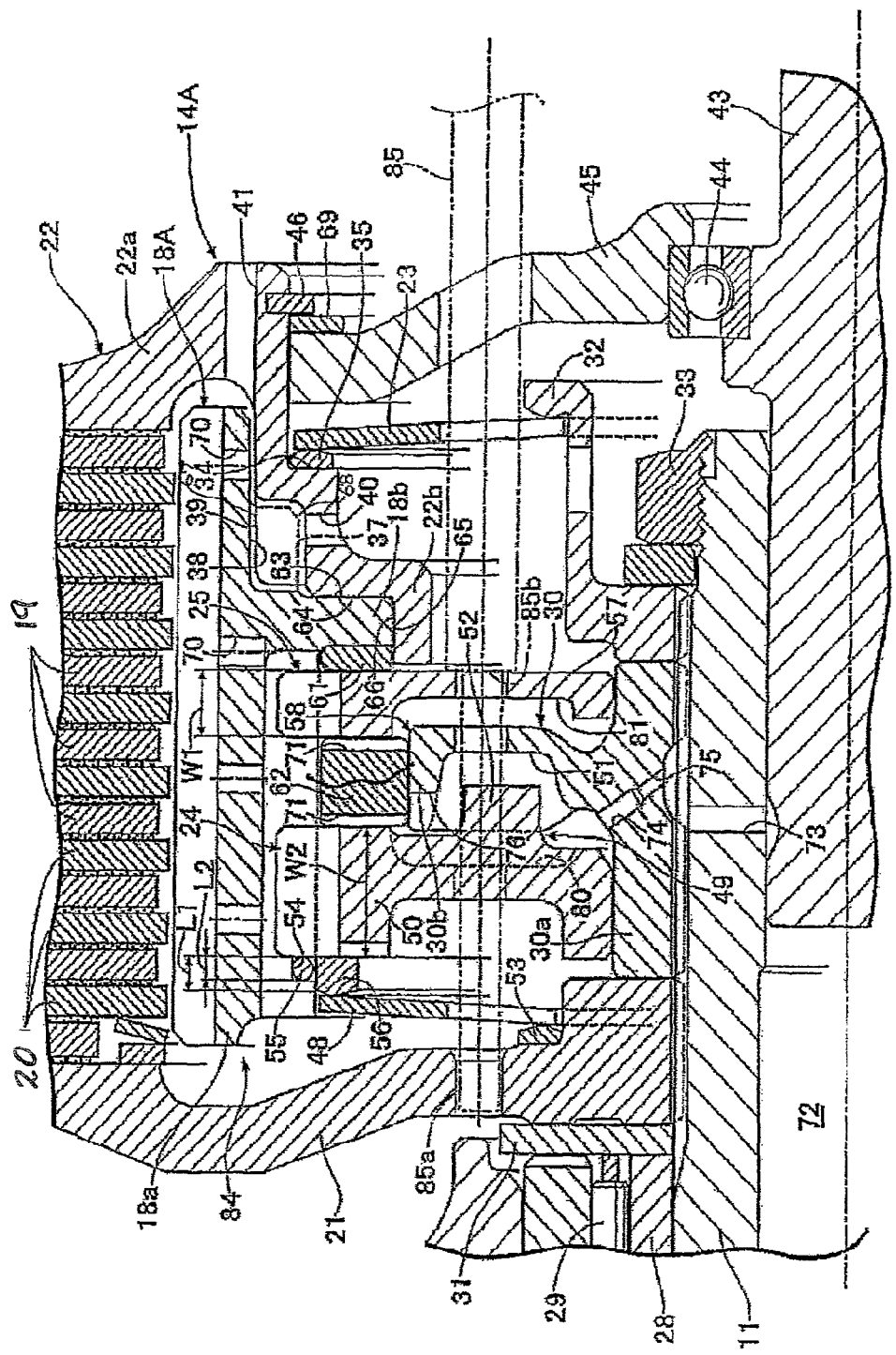
FIG. 2 is a magnified view of a part, which is indicated by an arrow 2, of the multi-plate clutch system shown in FIG. 1

By referring to FIG. 2, the multi-plate clutch system 14A, which is of a wet-type, includes: a clutch outer 17 connected to the primary driven gear 16, which serves as an input member, with the damper spring 13 in between; a clutch inner 18A which unitarily includes an engagement cylinder part 18a and an annular support wall 18b, the engagement cylinder part 18a coaxially placed inside the clutch outer 17, the annular support wall 18b extending from an inner surface of a middle portion of the engagement cylinder part 18a in a radially inward direction; multiple driving friction plates 19, which are engaged with the clutch outer 17 in such a way as to be relatively unrotatable; multiple driven friction plates 20, which are arranged to be interleaved with the driving friction plates 19, and are engaged with an outer periphery of the engagement cylinder part 18a of the clutch inner 18A in such a way as to be relatively unrotatable; a pressure bearing plate 21, serving as a clamp pressure plate, which is fixed to the main shaft 11 serving as the output member in such a way as to face one end side of the interleaved driving friction plates 19 and driven friction plates 20; a pressure plate 22 which sandwiches the interleaved driving friction plates 19 and driven friction plates 20 with the pressure bearing plate 21; a clutch spring 23 which biases the pressure plate 22 in a direction in which the pressure plate 22 presses the interleaved driving friction plates 19 and driven friction plates 20 with the pressure bearing plate 21; an assist mechanism 24 for strengthening the biasing force of the clutch spring 23 when acceleration torque is changed while driving force is transmitted from the primary driven gear 16 to the main shaft 11; and a slipper mechanism 25 for weakening the biasing force of the clutch spring 23 when deceleration torque is changed while back torque is transmitted from the main shaft 11 to the primary driven gear 16.

The clutch outer 17 unitarily includes: a cylinder part 17a coaxially surrounding an engagement cylinder part 18a of the clutch inner 18A; and an end wall part 17b continuing to an end portion of the cylinder part 17a on the primary driven gear 16 side. The clutch outer 17 is shaped like a cup, and has an opening away from the primary driven gear 16. Outer peripheral portions of the respective multiple driving friction plates 19 are engaged with an inner periphery of the cylinder part 17a in such a way that the multiple driving friction plates 19 are movable in the axial direction and are relatively unrotatable.

An annular step part 11a facing the multi-plate clutch system 14A is formed in a portion of an outer periphery of the main shaft 11, the portion corresponding to the primary speed reducing device 12. A cylinder-shaped sleeve 28, which is fitted to the outer periphery of the main shaft 11, has an end portion, which is located on a side away from the multi-plate clutch system 14A, in contact with the annular step part 11a. A needle bearing 29 is interposed between an outer periphery of this sleeve 28 and an inner periphery of the primary driven gear 16.

A center cam plate 30, which is common between the assist mechanism 24 and the slipper mechanism 25, is arranged radially inward of the engagement cylinder part 18a in the clutch inner 18A, and closer to the pressure bearing plate 21 than the annular support wall 18b in the clutch inner 18A. This center cam plate 30 unitarily includes: a cylinder-shaped boss part 30a which is spline-engaged with the outer periphery of the main shaft 11; and a disc part 30b which is arranged in a plane orthogonal to the axial direction of the main shaft 11, the disc part 30b extending radially outward from an axially middle portion of the boss part 30a.

On the other hand, the pressure bearing plate 21 is shaped like a disc. An inner peripheral portion of this pressure bearing plate 21 is spline-engaged with the outer periphery of the main shaft 11 in such a way as to be interposed between a ring plate-shaped pressing plate 31 and one end portion of the boss part 30a. In this respect, the pressing plate 31 is in contact with an end portion of the sleeve 28 which is located on the multi-plate clutch system 14A side. In addition, a spring bearing member 32, which interposes the boss part 30a with an inner periphery of the pressure bearing plate 21, is spline-engaged with the main shaft 11. A nut 33 is screwed to the main shaft 11 so as to interpose the spring bearing member 32 between the nut 33 and the boss part 30a. When this nut 33 is fastened, the sleeve 28, the pressing plate 31, the inner peripheral portion of the pressure bearing plate 21, the boss part 30a of the center cam plate 30, and the spring bearing member 32 are held between the annular step part 11a and the nut 33, so that the sleeve 28, the pressing plate 31, the pressure bearing plate 21, the center cam plate 30 and the spring bearing member 32 are fixed to the main shaft 11.

The pressure plate 22 unitarily includes an annular pressing part 22a and an insertion cylinder part 22b. The annular pressing part 22a sandwiches the driving friction plates 19 and the driven friction plates 20 with the pressure bearing plate 21. The insertion cylinder part 22 is installed continuously to the pressing part 22a in such a way as to be inserted into the engagement cylinder part 18a of the clutch inner 18A. The insertion cylinder part 22b is formed to have steps in such a way that the diameter thereof becomes smaller toward the extremity thereof in a stepwise fashion.

Further, the clutch spring 23 is a disc spring provided between the spring bearing member 32 fixed to the main shaft 11 and the pressure plate 22. An inner peripheral portion of this clutch spring 23 is in contact and engaged with the spring bearing member 32 from the center cam plate 30 side. An outer peripheral portion of the clutch spring 23 is in contact with an annular step part 34 with a ring-shaped sliding-contact plate 35 in between. The annular step part 34 is provided to the insertion cylinder part 22b of the pressure plate 22, and faces the opposite side from the center cam plate 30. Thus, it is configured that the pressure plate 22 is biased by the clutch spring 23 in a direction in which the pressure plate 22 turns the multi-plate clutch system 14A into a connected condition by bringing the driving friction plates 19 and the driven friction plates 20 into pressure contact with each other so as to cause frictional engagement therebetween.

The clutch inner 18A is movable relative to the main shaft 11 in the axial direction of the main shaft 11. This clutch inner 18A and the pressure plate 22, which is a member different from the clutch inner 18A, are connected together to be unrotatable relative to each other and to be capable of being separated from each other in the axial direction in such a way that, when the assist mechanism 24 increases the pressure-contact force of the pressure plate 22, the pressure plate 22 is moved in the direction to bring the driving friction plates 19 and the driven friction plates 20 into pressure contact with each other while the clutch inner 18A is moved relative to the pressure plate 22 in the same direction in such a way as to be detached from the pressure plate 22.

For this reason, the insertion cylinder part 22b of the pressure plate 22 is inserted in an end portion of the engagement cylinder part 18a of the clutch inner 18A, the end portion being on the pressure plate 22 side. Multiple groove forming projecting parts 37 are provided to one of the inner periphery of the engagement cylinder part 18a and the outer periphery of the insertion cylinder part 22b, that is to say, the inner periphery of the engagement cylinder part 18a in this embodiment. Multiple spline projecting parts 39 are provided to the other of the inner periphery of the engagement cylinder part 18a and the outer periphery of the insertion cylinder part 22b, that is to say, the outer periphery of the insertion cylinder part 22b in this embodiment. Spline grooves 38 which engage with the spline projecting parts 39 are formed in the groove forming projecting parts 37, respectively.

A first oil passage 40 for guiding oil to engagement parts between the spline grooves 38 and the spline projecting parts 39 is formed in the insertion cylinder part 22b of the pressure plate 22 in such a way as to penetrate the insertion cylinder part 22b in the radial direction. In addition, a second oil passage 41 for guiding oil to the engagement parts between the spline grooves 38 and the spline projecting parts 39 is formed in the pressing part 22a of the pressure plate 22 in such a way as to penetrate the pressing part 22a in the axial direction.

The multi-plate clutch system 14A is covered with an engine cover 42 provided to the engine. One end portion of an operation shaft 43 is fitted in the engine cover 42 in such a way as to be movable in the axial direction, and the other end portion of the operation shaft 43 is fitted in the main shaft 11 coaxially and slidably. An inner peripheral portion of a disc-shaped lifter 45 is held by a middle portion of this operation shaft 43 with a clutch bearing 44 interposed in between. An outer periphery of this lifter 45 is in contact with, and engaged with, a stop ring 46, which is attached to the inner periphery of the pressing part 22a of the pressure plate 22, from the clutch spring 23 side with a ring-shaped sliding-contact plate 69 being interposed in between.

A control shaft 47 for switching between disconnection and connection of the multi-plate clutch system 14A is rotatably and movably supported by the engine cover 42. A lever 48L is provided to an end portion of the control shaft 47 which projects from the engine cover 42. In addition, the one end portion of the operation shaft 43 is engaged with an inner end portion of the control shaft 47 in such a way that the operation shaft 43 moves in the axial direction along with the rotation of the control shaft 47. Thus, by rotating the control shaft 47 to move the operation shaft 43 in the direction in which the pressing part 22a of the pressure plate 22 comes away from the pressure bearing plate 21, the multiple clutch system 14A disconnects the power transmission.

The assist mechanism 24 moves the pressure plate 22 closer to the pressure bearing plate 21 as the driving power inputted from the primary driven gear 16 becomes larger. The assist mechanism 24 includes: a spring 48 for exerting a spring force for biasing the clutch inner 18A against a spring force of the clutch spring 23; and a cam mechanism 49 for forcedly moving the clutch inner 18A against the biasing force of the spring 48 in order to assist the pressure plate 22 in increasing the pressure-contact force when acceleration torque is changed.

The cam mechanism 49 is placed between the disc part 30b of the center cam plate 30 fixed to the main shaft 11 and an assist cam plate 50 whose inner peripheral portion is slidingly supported by the boss part 30a of the center cam plate 30 in such a way as to be opposed to one surface of the disc part 30b. An outer periphery of the assist cam plate 50 is spline-engaged with the inner periphery of the engagement cylinder part 18a of the clutch inner 18A.

Figure 4A:
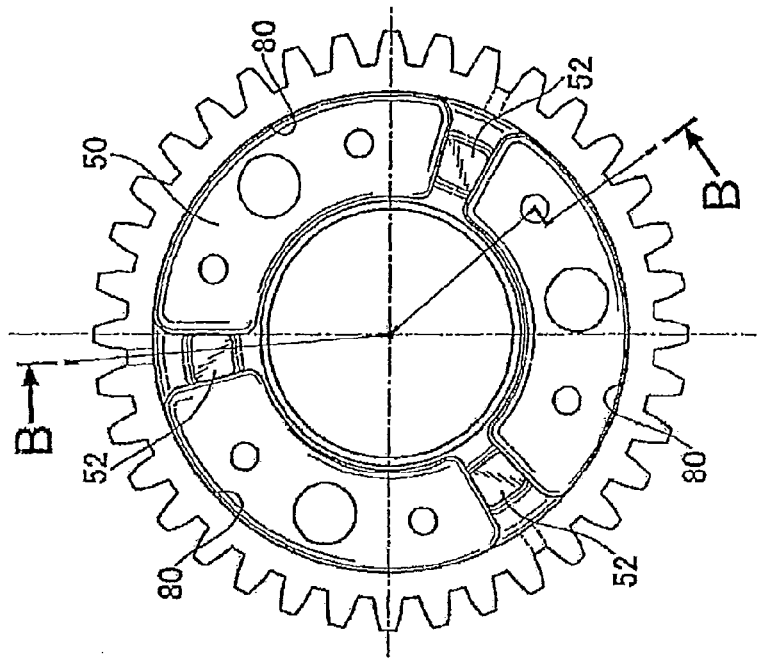
FIGS. 4(A) to 4(C) are views of an assist cam plate, respectively showing a right side in FIG. 4(A), a longitudinal cross section in FIG. 4 in FIG. 4(B), and a left side in FIG. 4(C)
Figure 4B:
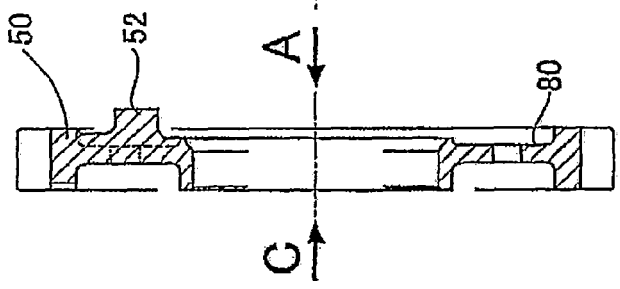
Figure 4C:
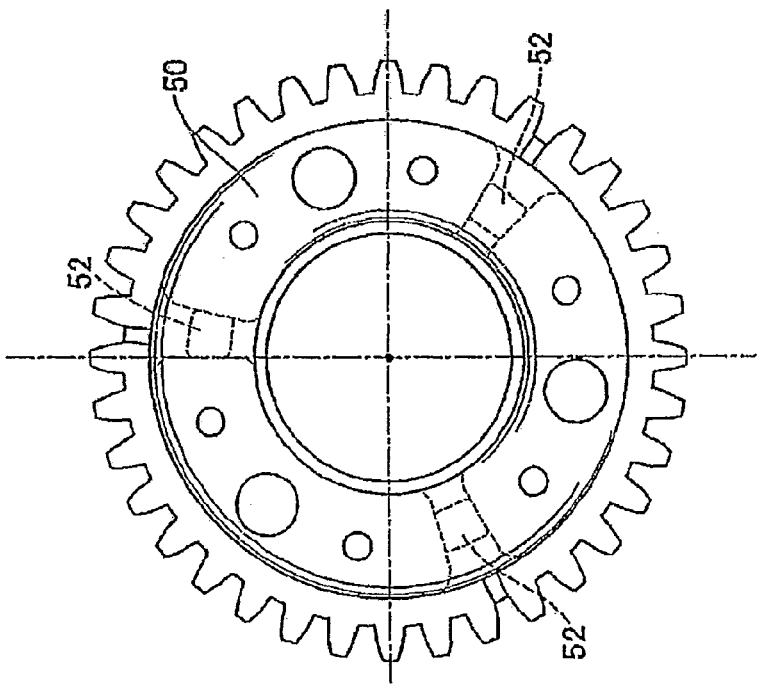

Referring to FIG. 3, multiple, for instance, three first depressed cams 51 are made in the one surface of the disc part 30b of the center cam plate 30 in such a way as to be arranged at the same intervals in the circumferential direction. As shown in FIG. 4, multiple, for instance, three first projecting cams 52 for constituting the cam mechanism 49 in cooperation with the first depressed cams 51 are projectingly provided in a surface of the assist cam plate 50 on the disc part 30b side.

A stop ring 55 put in an annular depressed part 54 made in the inner periphery of the engagement cylinder part 18a of the clutch inner 18A is in contact with, and engages with, an outer periphery of the opposite end surface of the assist cam plate 50 from the disc part 30b.

In addition, the spring 48 is a disc spring whose inner peripheral portion is in contact with, and supported by, the inner peripheral portion of the pressure bearing plate 21 with a ring-shaped sliding-contact plate 53 interposed in between. An outer periphery of this spring 48 is in contact with an annular bearing member 56 which is in contact with one of the end surfaces of the assist cam plate 50 which is situated farther from the center cam plate 30. In addition, the bearing member 56 is placed contiguous to an inner periphery of the stop ring 55. An outer diameter of the bearing member 56 is set equal to an inner diameter of the stop ring 55 as put in the annular depressed part 54. An axial length L1 of the bearing member 56 is set larger than an axial width L2 of the opening of the annular depressed part 54.

The slipper mechanism 25 moves the clutch inner 18A in the direction in which the pressure plate 22 is caused to come away from the pressure bearing plate 21 when deceleration torque is changed. The slipper mechanism 25 is made up by providing a cam mechanism 58 between the center cam plate 30 and a slipper cam plate 57 whose inner peripheral portion is slidingly supported by the boss part 30a of the center cam plate 30 in such a way that the slipper cam plate 57 is opposed to the other surface of the disc part 30b of the center cam plate 30. An outer periphery of the slipper cam plate 57 is spline-engaged with the inner periphery of the engagement cylinder part 18a of the clutch inner 18 A.

Figure 5A:
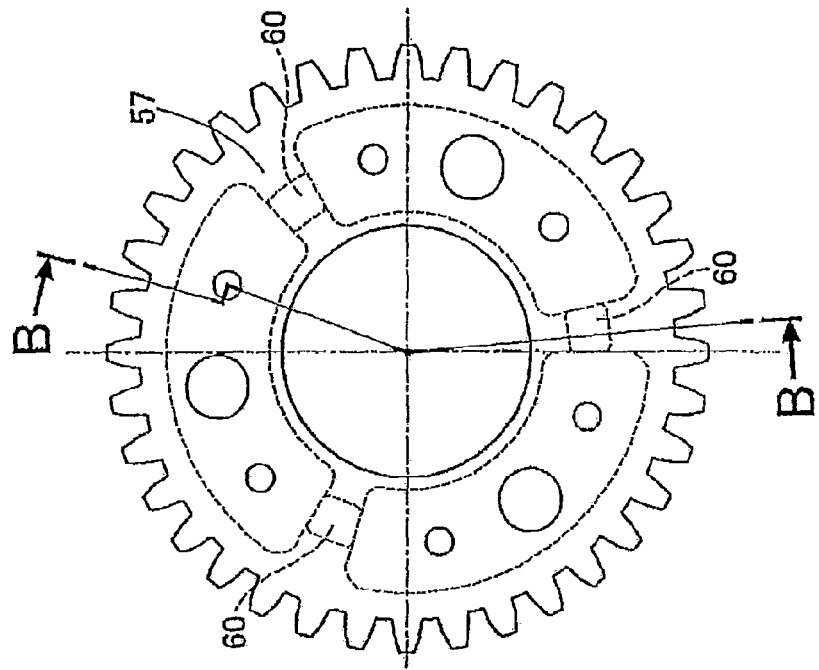
FIGS. 5(A) to 5(C) are views of a slipper cam plate, respectively showing a right side in FIG. 5(A), a longitudinal cross section in FIG. 5(B), and a left side in FIG. 4(C)
Figure 5B:
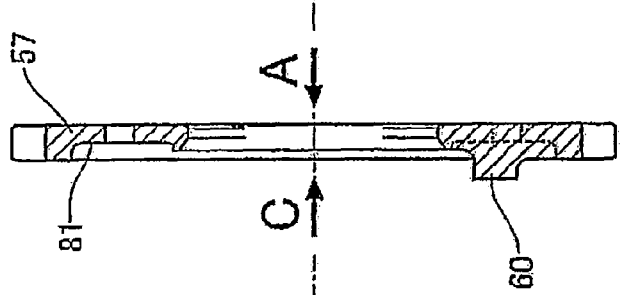
Figure 5C:
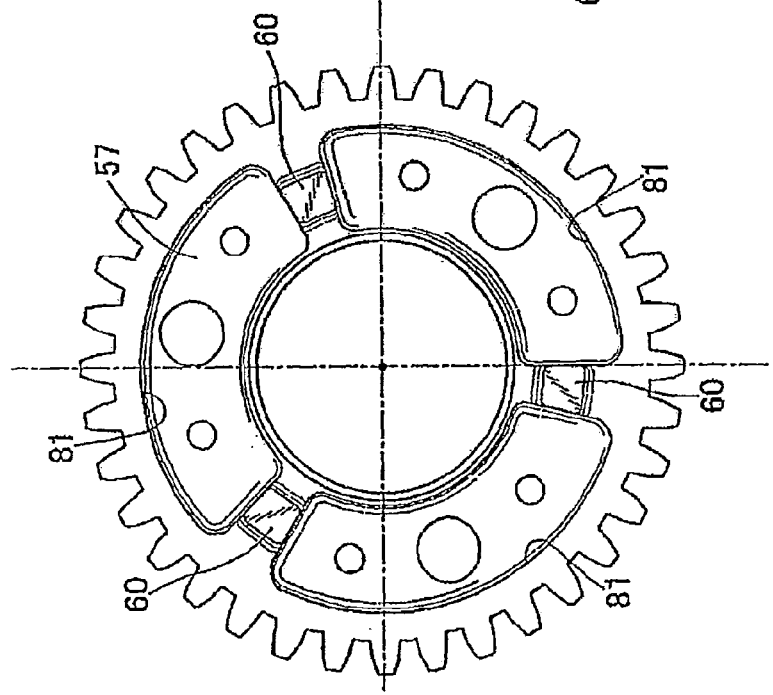

As shown in FIG. 3, multiple, for instance, three second depressed cams 59 are made in the other surface of the disc part 30b of the center cam plate 30 at the same intervals in the circumferential direction in such a way that each of the second depressed cams 59 is located in a center portion between the corresponding two of the first depressed cams 51. As shown in FIG. 5, multiple, for instance, three second depressed cams 60 for constituting the cam mechanism 58 in cooperation with the second depressed cams 59 are projectingly provided in a surface of the slipper cam plate 57 on the disc part 30b side.

An outer periphery of the opposite end surface of the slipper cam plate 57 from the disc part 30b is in contact with the annular support wall 18b of the clutch inner 18A with a ring-shaped sliding-contact plate 61 being interposed in between. The assist cam plate 50 and the slipper cam plate 57 opposed to the respective two sides of the disc part 30b of the center cam plate 30 are fixed to the clutch inner 18A in such a way as to be held between the annular support wall 18b provided to the clutch inner 18A and the stop ring 55 put in the inner periphery of the engagement cylinder part 18a of the clutch inner 18A.

Furthermore, a guide ring 62 interposed between the assist cam plate 50 and the slipper cam plate 57 is placed between an outer periphery of the disc part 30b of the center cam plate 30 and the inner periphery of the engagement cylinder part 18a of the clutch inner 18A.

Moreover, a width W1 of the spline engagement of the slipper cam plate 57 with the clutch inner 18A is set smaller than a width W2 of the spline engagement of the assist cam plate 50 (the other cam plate) with the clutch inner 18A. The slipper cam plate 57 is placed closer to the annular support wall 18b provided to the clutch inner 18 out of the assist cam plate 50 and the slipper cam plate 57.

Further, the clutch inner 18A and the pressure plate 22 are provided with flat abutment parts 63, 64, which extend along the planes orthogonal to the axes of the clutch inner 18A and the pressure plate 22 in such a way that the flat abutment parts 63, 64 are in contact with each other, respectively. In this embodiment, the abutment part 63 is formed in such a way as to unitarily continue to the multiple groove forming projecting parts 37 in the inner periphery of the engagement cylinder part 18a of the clutch inner 18A, and concurrently to extend inward in the radial direction. The other abutment part 64 is formed in the middle of the insertion cylinder part 22b in such a way as to unitarily continue to the spline projecting parts 39 and to extend inward in the radial direction.

In addition, during a normal power transmitting condition, the abutment part 63 of the clutch inner 18A biased toward the pressure plate 22 by the spring 48 is in contact with the abutment part 64 of the pressure plate 22. Accordingly, a biasing force in the reverse direction, which is produced by the spring 48 to offset the biasing force of the clutch spring 23, acts on the pressure plate 22.

If acceleration torque is changed while the torque is being transmitted from the primary driven gear 16 to the main shaft 11, cam side surfaces of the first projecting cams 52 are brought into contact with cam side surfaces of the first depressed cams 51, respectively. Thereby, the cam mechanism 49 subjects the assist cam plate 50 to a force which causes the assist cam plate 50 to detach from the disc part 30b of the center cam plate 30. Thus, the clutch inner 18A to which the assist cam plate 50 is fixed moves in a direction in which the clutch inner 18A detaches from the pressure plate 22, and the bearing member 56 in contact with the assist cam plate 50 moves in a direction which decreases the spring force of the spring 48. This decreases the biasing force in the reverse direction which is produced by the spring 48 and acts to offset the biasing force of the clutch spring 23, and hence assists the clutch spring 23 in fully exerting its biasing force, accordingly increasing the pressure-contact force between the driving friction plates 19 and the driven friction plates 20.

In addition, if back torque increases while the back torque is being transmitted, the cam mechanism 58 of the slipper mechanism 25 moves the slipper cam plate 57, which is fixed to the clutch inner 18A, in a direction in which the slipper cam plate 57 detaches from the center cam plate 30. This movement of the slipper cam plate 57 brings the abutment part 63 of the clutch inner 18A into intimate contact with the abutment part 64 of the pressure plate 22. Accordingly, the pressure plate 22 moves in a direction which decreases the pressure-contact force between the driving friction plates 19 and the driven friction plates 20.

The clutch inner 18A and the pressure plate 22 are provided with their respective sliding-contact surfaces 65, 66 in such a way that the side-contact surfaces 65, 66 are in sliding contact with each other. The sliding-contact surfaces 65, 66 continue to inner ends of the two abutment parts 63, 64 which extend in the radial directions of the clutch inner 18A and the pressure plate 22, respectively. The sliding-contact surfaces 65, 66 are formed in the shape of an arc about the center axis line of the clutch inner 18A. In other words, an inner peripheral surface of the annular support wall 18b provided to the clutch inner 18A is in sliding contact with the insertion cylinder part 22b of the pressure plate 22. The sliding-contact surface 66 in sliding contact with the sliding-contact surface 65 formed in the inner periphery of the annular support wall 18b is formed in an outer periphery of the extremity of the insertion cylinder part 22b.

In addition, a space 67 is formed between the spline projecting parts 39 and the inner periphery of the engagement cylinder part 18a, and a space 68 is formed between the groove forming projecting part 37 and the outer periphery of the insertion cylinder part 22b.

The guide ring 62 is fixed to the clutch inner 18A by the interposition of the guide ring 62 between the assist cam plate 50 and the slipper cam plate 57. An inner periphery of this guide ring 62 is in sliding contact with an outer periphery of the disc part 30a of the center cam plate 30. Furthermore, multiple oil holes 70 for connecting inner and outer sides of the engagement cylinder part 18a of the clutch inner 18A are made in the engagement cylinder part 18a. Oil grooves 71 for causing oil to flow between the guide ring 62 and the assist cam plate 50 as well as between the guide ring 62 and the slippery cam plate 57 are made in the two sides of the guide ring 62.

Moreover, a center hole 72 for guiding oil is coaxially provided in the main shaft 11. Oil passages 73 whose ends communicate with the center hole 72 are made in the sidewall of the main shaft 11 at a position which substantially corresponds to the center portion, in the axial direction, of the boss part 30a of the center cam plate 30. Oil supplying passages 74 for supplying oil from the oil passages 73 to the first projecting cams 52 of the assist cam plate 50 and the second projecting cams 60 of the slipper cam plate 57 are made in the boss part 30a of the center cam plate 30 in such a way as to be oriented in a direction which tilts to the center axis line of the assist cam plate 50 and slipper cam plate 57. Orifices 75 are installed in the respective oil supplying passages 74.

The multiple first depressed cams 51 are made in one surface of the disc part 30b of the center cam plate 30, and the multiple second depressed cams 59 are made in the other surface of the disc plate 30b of the center cam plate 30. Oil discharging passage 76 for guiding oil to a sliding-contact area between an outer periphery of the center cam plate 30 and an inner periphery of the guide ring 62 are provided in outer peripheral edge portions of the first depressed cams 51. Oil discharging passage 77 for guiding oil to the sliding-contact area between the outer periphery of the center cam plate 30 and the inner periphery of the guide ring 62 are provided in outer peripheral edge portions of the second depressed cams 59 (see FIG. 3). In addition, the oil discharging passages 76, 77 are formed as notches made in the outer peripheral edge portions of the first and second depressed cams 51, 59. In the disc part 30b of the center cam plate 30, at least areas in which the first and second depressed cams 51, 59 are placed, as well as the notches in the outer peripheral edge portions of the first and second depressed cams 51, 59, are formed by forging.

Furthermore, contact surfaces of the first depressed cams 51 and the first projecting cams 52, which constitute the cam mechanism 49 provided between the center cam plate 30 and the assist cam plate 50, are formed in such a way that the contact surfaces of the first depressed cams 51 and the contact surfaces of the first projecting cams 52 are brought into contact with each other when the assist cam plate 50 rotates relative to the center cam plate 30. Contact surfaces of the second depressed cams 59 and the second projecting cams 60, which constitute the cam mechanism 58 provided between the center cam plate 30 and the assist cam plate 57, are formed in such a way that the contact surfaces of the second depressed cams 59 and the contact surfaces of the second projecting cams 60 are brought into contact with each other when the slipper cam plate 57 rotates relative to the center cam plate 30. The oil discharging passages 76, 77 are provided only in the corresponding outer peripheral edge portions of the disc part 30b of the center cam plate 30.

Moreover, the first projecting cams 52 are provided in the surface of the assist cam plate 50 which is opposed to the disc part 30b of the center cam plate 30. Additionally, multiple, for instance, three first depressed parts 80 are formed in such a way that each two neighboring first depressed parts 80 are placed respectively in the two sides of the corresponding one of the first projecting cams 52. The second projecting cams 60 are provided in the surface of the slipper cam plate 57 which is opposed to the disc part 30b of the center cam plate 30. In addition, multiple, for instance, three second depressed parts 81 are formed in such a way that each two neighboring second depressed parts 81 are placed respectively in the two sides of the corresponding one of the second projecting cams 60.

Note that the spring 48, the bearing member 56, the assist cam plate 50, the guide ring 62, the center cam plate 30, the slipper cam plate 57 and the sliding-contact plate 61 are inserted in the engagement cylinder part 18a of the clutch inner 18A from the pressure bearing plate 21 side. For installation, the spring 48, the bearing member 56, the assist cam plate 50, the guide ring 62, the center cam plate 30, the slipper cam plate 57 and the sliding-contact plate 61 are beforehand assembled into an assembled body 84. An annular step part 85b for holding the assembled body 84 between the annular step part 85b and the pressure bearing plate 21 is provided to a rod-like holding tool 85 penetrating the assembled body 84 in such a way that an extremity small-diameter part 85a of the holding tool 85 is fitted in the pressure bearing plate 21, as shown by the chain line in FIG. 2. Thereafter, the clutch inner 18A is fitted to the assembled body 84 in such a way that the assembled body 84 is covered with the clutch inner 18A while held between the holding tool 85 and the pressure bearing plate 21.

Next, descriptions will be provided for the operation of Embodiment 1. The clutch inner 18A movable in the axial direction of the main shaft 11 and the pressure plate 22 which is a member different from the clutch inner 18A are connected together to be unrotatable relative to each other and to be capable of being separated from each other in the axial direction in such a way that, when the assist mechanism 24 increases the pressure-contact force of the pressure plate 22, the pressure plate 22 is moved in the direction to bring the driving friction plates 19 and the driven friction plates 20 into pressure contact with each other while the clutch inner 18A is moved relative to the pressure plate 22 in the same direction in such a way as to be detached from the pressure plate 22. For this reason, even if the biasing force of the clutch spring 23 and the retracting force of the assist mechanism 24 act at almost the same timing, these forces can be prevented from directly working on the pressure plate 22. This avoids an abrupt clutch connection, and accordingly makes it possible to achieve an appropriate clutch connection.

In addition, the slipper mechanism 25 is placed between the clutch inner 18A and the main shaft 11 in order that, when deceleration torque is changed, the slipper mechanism 25 can decrease the pressure-contact force produced by the pressure plate 22 by: bringing the clutch inner 18A in intimate contact with the pressure plate 22; and thus causing the pressure plate 22 to move in the direction in which the pressure plate 22 decreases the pressure-contact force between the driving friction plates 19 and the driven friction plates 20. When the slipper mechanism 25 decreases the pressure-contact force produced by the pressure plate 22 in response to the change in the deceleration torque, back torque can be blocked instantaneously. Thereby, when assisted, an appropriate clutch connection can be achieved, and the back torque limiter capability can be secured as before.

In addition, the assist mechanism 24 includes: the spring 48 configured to exert the spring force for biasing the clutch inner 18A against the spring force of the clutch spring 23; and the cam mechanism 49 configured to forcedly move the clutch inner 18A against the biasing force of the spring 48 in order that the pressure-contact force of the pressure plate 22 can be increased when acceleration torque is changed. This realizes the structure in which: when assisted, the spring load of the spring 48 opposed to the clutch spring 23 is reduced; thereby, the substantial spring load of the clutch spring 23 is increased; and the pressure-contact force is thus increased. Accordingly, since the biasing force of the clutch spring 23 can be increased gradually, a smooth clutch connection can be realized.

Furthermore, the clutch 18A includes the engagement cylinder part 18a which engages the driving friction plates 20 with its outer periphery; the insertion cylinder part 22b coaxially inserted in the engagement cylinder part 18a is provided in the pressure plate 22; the multiple groove forming projecting parts 37 are made in the inner periphery of the engagement cylinder part 18a in order that spline grooves 38 can be formed in the respective groove forming projecting parts 37; and the multiple spline projecting parts 39 engaged with the respective spline grooves 38 are made in the outer periphery of the insertion cylinder part 22b. This enables the clutch inner 18A and the pressure plate 22 to be spline-engaged with each other while avoiding the clutch inner 18A becoming larger in size in the axial direction without adversely affecting the area of engagement of the driven friction plates 20 with the outer periphery of the engagement cylinder part 18a.

Moreover, the clutch inner 18A and the pressure plate 22 are provided with the flat abutment parts 63, 64, which extend along the planes orthogonal to the axes of the clutch inner 18A and the pressure plate 22, respectively, in such a way that the flat abutment parts 63, 64 come in contact with each other when the clutch inner 18A is brought into intimate contact with the pressure plate 22. This makes it possible to decrease the abutment pressure by receiving the load by their flat surfaces when the clutch inner 18A and the pressure plate 22 are brought in intimate contact with each other, and accordingly to secure the rigidities of the respective abutment parts 63, 64.

Additionally, the multiple groove forming projecting parts 37 are made in the clutch inner 18A in such a way that the spline grooves 38 are respectively formed in the groove forming projecting parts 37; and the multiple spline projecting parts 39 to be engaged with the respective spline grooves 38 are provided in the pressure plate 22. In this respect, the abutment parts 63, 64 extend inwards in the radial direction from the groove forming projecting parts 37 and the spline projecting parts 39 in such a way as to unitarily continue to the groove forming projecting parts 37 and the spline projecting parts 39. This makes it possible to reinforce the groove forming projecting parts 37 and the spline projecting parts 39 by thickening the perimeters of the groove forming projecting parts 37 and the spline projecting parts 39.

In addition, the first oil passage 40 for guiding the oil to the engagement area between the spline grooves 38 and the spline projecting parts 39 is made in the pressure plate 22 in such a way as to penetrate the insertion cylinder part 22b in the radial direction. This makes it possible to enhance the slidability of the spline engagement area by supplying the oil to the spline engagement area. Further, the second oil passage 41 for guiding the oil to the engagement area between the spline grooves 38 and the spline projecting parts 39 is made in the pressure plate 22 in such a way as to penetrate the pressing part 22a of the pressure plate 22 in the radial direction. This makes it possible to enhance the slidability of the spline engagement area by supplying the oil to the spline engagement area in the longitudinal direction of the spline grooves 38 and the spline protruding parts 39.

Furthermore, the clutch inner 18A and the pressure plate 22 are provided with the sliding-contact surfaces 65, 66, which continue to the inner ends of the two abutment parts 63, 64 extending in the clutch inner 18A and the pressure plate 22 in their radial directions, and which are formed in the shape of an arc about the center axis line of the clutch inner 18A, in such a way that the sliding-contact surfaces 65, 66 are brought into sliding contact with each other, respectively. Since these sliding-contact surfaces 65, 66 are brought into sliding contact with each other, the axis of the clutch inner 18A and the axis of the pressure plate 22 become less likely to be displaced from each other. This makes it possible to make the slide in the spline engagement area far smoother.

Moreover, the space 67 is formed between the spline projecting parts 39 and the inner periphery of the engagement cylinder part 18a, and the space 68 is formed between the groove forming projecting parts 37 and the outer periphery of the inserting cylinder part 22b. This makes it possible not only to inhibit the increase in the slide area of the spline engagement area with the displacement of the axes of the clutch inner 18A and the pressure plate 22 from each other being prevented by the sliding contact between the sliding-contact surfaces 65, 66, but also to enhance the slidability and lubricity of the spline engagement area by efficiently using the spaces 67, 68 as the passage through which to flow the oil.

The assist mechanism 24 includes the center cam plate 30 and the assist cam plate 50 which are opposed to each other in the axial direction. The assist cam plate 50 is inserted in, and engaged with, the clutch inner 18A in such a way that the assist cam plate 50 is unrotatable relative to the clutch inner 18A. The stop ring 55 engaged with the assist cam plate 50 is put in the inner periphery of the engagement cylinder part 18a of the clutch inner 18A in order that the stop ring 55 can block the assist cam plate 50 from moving relative to the clutch inner 18A in such an axial direction that the assist cam plate 50 detaches from the center cam plate 30. The fixation of the assist cam plate 50 to the clutch inner 18A can be achieved by fixing the assist cam plate 50 to the clutch inner 18A by use of the stop ring 55 without creating an unbalance in attaching the assist cam plate 50 to the clutch inner 18A in the circumferential direction while inhibiting increase in the number of parts, weight and costs, as compared with the conventional fixing structure using bolts.

In addition, the spring 48 included in the assist mechanism 24 biases the clutch inner 18A in the axial direction with the assist cam plate 50 being interposed in between. The annular bearing member 56 receiving the end portion of the spring 48 on the clutch inner 18A side, is placed contiguous to the inner periphery of the stop ring 55. For this reason, it is possible to prevent the stop ring from coming off by use of the bearing member 56. This eliminates the need for a specialized member for preventing the stop ring from coming off, and thus can contribute to reduction in the number of parts.

Furthermore, the annular depressed part 54 in which to put the stop ring 55 is made in the inner periphery of the engagement cylinder part 18*a* of the clutch inner 18A, and the bearing member 56 is formed in such a way as to have the outer diameter which is equal to the inner diameter of the stop ring 55 as put in the annular depressed part 54. Accordingly, the bearing member 56 is fitted to the stop ring 55, and thus it is possible to securely prevent the stop ring 55 from coming off.

Moreover, the axial length L1 of the bearing member 56 is set larger than the axial width L2 of the opening of the annular depressed part 54. For this reason, the stop ring 55 can be protected by the bearing member 56 in such a way that the annular depressed part 54 in which the stop ring 55 is put can be covered with the bearing member 56.

In addition, the multi-plate clutch system 14A includes both the assist mechanism 24 and the slipper mechanism 25. Common between the assist mechanism 24 and the slipper mechanism 25 is the center cam plate 30. The center cam plate 30 is fixed to the main shaft 11. The assist cam plate 50 and the slipper cam plate 57 are opposed to the two sides of the disc part 30*b* of the center cam plate 30. The assist cam plate 50 and the slipper cam plate 57 are fixed to the clutch inner 18A in such a way as to be held between the annular support wall 18*b* provided to the clutch inner 18A and the stop ring 55. For this reason, the fixing of the assist cam plate 50 and the slipper cam plate 57 to the clutch inner 18A can be achieved by the single stop ring 55. Accordingly, it is possible to reduce parts in number.

The annular guide ring 62 is interposed between the assist cam plate 50 and the slipper cam plate 57. This guide ring 62 is placed between the outer periphery of the center cam plate 30 and the inner periphery of the clutch inner 18A. For this reason, increase in the number of parts needed for the structure in which the assist cam plate 50 and the slipper cam plate 57 are fixed to the clutch inner 18A by use of the single stop ring 55 can be inhibited by interposing the annular guide ring 62 used for holding the clutch inner 18A with the center cam plate 30, between the assist cam plate 50 and the slipper cam plate 57.

Furthermore, the outer peripheries of the assist cam plate 50 and the slipper cam plate 57 are spline-engaged with the inner periphery of the engagement cylinder part 18*a* of the clutch inner 18A. The width W1 of the spline engagement of the slipper cam plate 57, which is placed on the annular support wall 18*b* side out of the assist cam plate 50 and the slipper cam plate 57, with the clutch inner 18A is set smaller than the width W2 of the spline engagement of the assist cam plate 50 with the clutch inner 18A. For this reason, it is possible to prevent the displacement of the axis of the assist cam plate 50 which would otherwise occur easily due to the biasing of the assist cam plate 50 by the spring 48, when the width W2 of the spline engagement of the assist cam plate 50, which is biased by the spring 48, with clutch inner 18A is made larger.

Moreover, the inner peripheral surface of the annular support wall 18*b* provided to the clutch inner 18A is in sliding contact with the pressure plate 22. For this reason, it is possible to prevent the displacement of the axes of the clutch inner 18A and the pressure plate 22, since the clutch inner 18A is supported by the pressure plate 22.

Besides, the assist mechanism 24 includes the center cam plate 30 and the assist cam plate 50 which are opposed to each other in the axial direction. The slipper mechanism 25 includes: the center cam plate 30 which is common between the slipper mechanism 25 and the assist mechanism 24; and the slipper cam plate 57 which is opposed to the center cam plate 30 in the axial direction. The guide ring 62 whose inner peripheral surface is in sliding contact with the outer peripheral surface of the center cam plate 30, which is one cam plate of any pair of the cam plates 30, 50 and the cam plates 30, 57, is fixed to the engagement cylinder part 18*a* of the clutch inner 18A. In addition, the oil discharging passages 76, 77 for guiding the oil to the sliding-contact area between the center cam plate 30 and the guide ring 62 are made in the outer peripheral edge portions of the first and second depressed cams 51, 59 provided respectively in the two surfaces of the disc part 30*b* of the center cam plate 30.

Accordingly, the centering of the guide ring 62 fixed to the clutch inner 18A, in other words, the alignment of the clutch inner 18A and the center cam plate 30 are achieved. Such an alignment structure enables oil, which is accumulated in the first and second depressed cams 51, 59 provided in the center cam plate 30, to be sufficiently supplied to the sliding-contact area between the guide ring 62 and the center cam plate 30. Thus, the lubricity can be enhanced.

Furthermore, the oil discharging passages 76, 77 are formed as notches made in the outer peripheral edge portions of the first and second depressed cams 51, 59. For this reason, it is possible to form the oil discharging passages 76, 77 with the simple structure. The simple structure can enhance the lubricity of the sliding-contact area.

Moreover, in the center cam plate 30, at least areas in which the first and second depressed cams 51, 59 are placed are formed by forging. For this reason, the depressions of the first and second depressed cams 51, 59 can be made shallow in depth by making notches in the outer peripheral edge portions of the first and second depressed cams 51, 59. This inhibits the amount of deformation of the parts during their pressing, and thus inhibits defective pressed products from being produced. Accordingly, the precision can be enhanced.

Besides, the contact surfaces of the first depressed cams 51 and the first projecting cams 52, which constitute the cam mechanism 49 provided between the center cam plate 30 and the assist cam plate 50, as well as the contact surfaces of the second depressed cams 59 and the second projecting cams 60, which constitute the cam mechanism 58 provided between the center cam plate 30 and the slipper cam plate 57, are formed in order to come into contact with each other when the assist cam plate 50 and the slipper cam plate 57 rotate relative to the center cam plate 30. The oil discharging passages 76, 77 are provided to only the edge portion of the outer periphery of the disc part 30*b* of the center cam plate 30. This avoids decrease in the cam contact strength by providing no oil discharging passages to the contact surfaces between the first depressed cams 51 and the first projecting cams 52, or the contact surfaces between the second depressed cams 59 and the second projecting cams 60. For this reason, the lubricity in the sliding-contact areas can be secured.

In addition, the first depressed parts 80 are formed in the assist cam plate 50 in such a way that each two neighboring first depressed parts 80 are respectively situated in the two sides of the corresponding one of the first projecting cams 52. The second depressed parts 81 are formed in the slipper cam plate 57 in such a way that each two neighboring second depressed parts 81 are respectively situated in the two sides of the corresponding one of the second projecting cams 62. For this reason, oil supplied to each of the first projecting cams 52 can be captured by, and held in, the corresponding two of the first depressed cams 80 which are respectively situated in the two sides of the first projecting cam 52. Oil supplied to each of the second projecting cams 60 can be captured by, and held in, the corresponding two of the second depressed cams 81, which are respectively situated in the two sides of the second projecting cam 60. Thereby, it is possible to secure oil which is sufficiently distributed to the first and second projecting cams 52, 60. This makes it possible to enhance the lubricity between the first depressed cams 51 and the first projecting cams 52, as well as between the second depressed cams 59 and the second projecting cams 60.

Furthermore, the outer peripheral edge portions of the first and second depressed parts 80, 81 are formed in such a way as to curve toward the sliding-contact area between the center cam plate 30 and the street ring 62. For this reason, oil accumulated in the first and second depressed cams 51, 59 can be actively supplied to the sliding-contact areas. Accordingly, it is possible to enhance the lubricity.

Moreover, the oil supplying passages 74 for supplying oil to the first projecting cams 52 of the assist cam plate 50 and the second projecting cams 60 of the slipper cam plate 57 are made in the boss part 30a of the center cam plate 30 in such a way as to be oriented in a direction which tilts to the center axis line of the assist cam plate 50 and slipper cam plate 57. For this reason, oil can be injected to the gaps between the first depressed cams 51 and the first projecting cams 52, as well as the gaps between the second depressed cams 59 and the second projecting cams 60, which need lubricity most. This makes it possible to prevent lack of lubricity which would otherwise occur due to shortage of oil.

Moreover, orifices 75 are installed in the respective oil supplying passages 74. For this reason, oil can be injected with a high pressure, sprayed and spread to the first and second projecting cams 52, 60. Thereby, the overall lubricity can be enhanced between the first depressed cams 51 and the first projecting cams 52, as well as between the second depressed cams 59 and the second projecting cams 60.

Example 2

Figure 6:
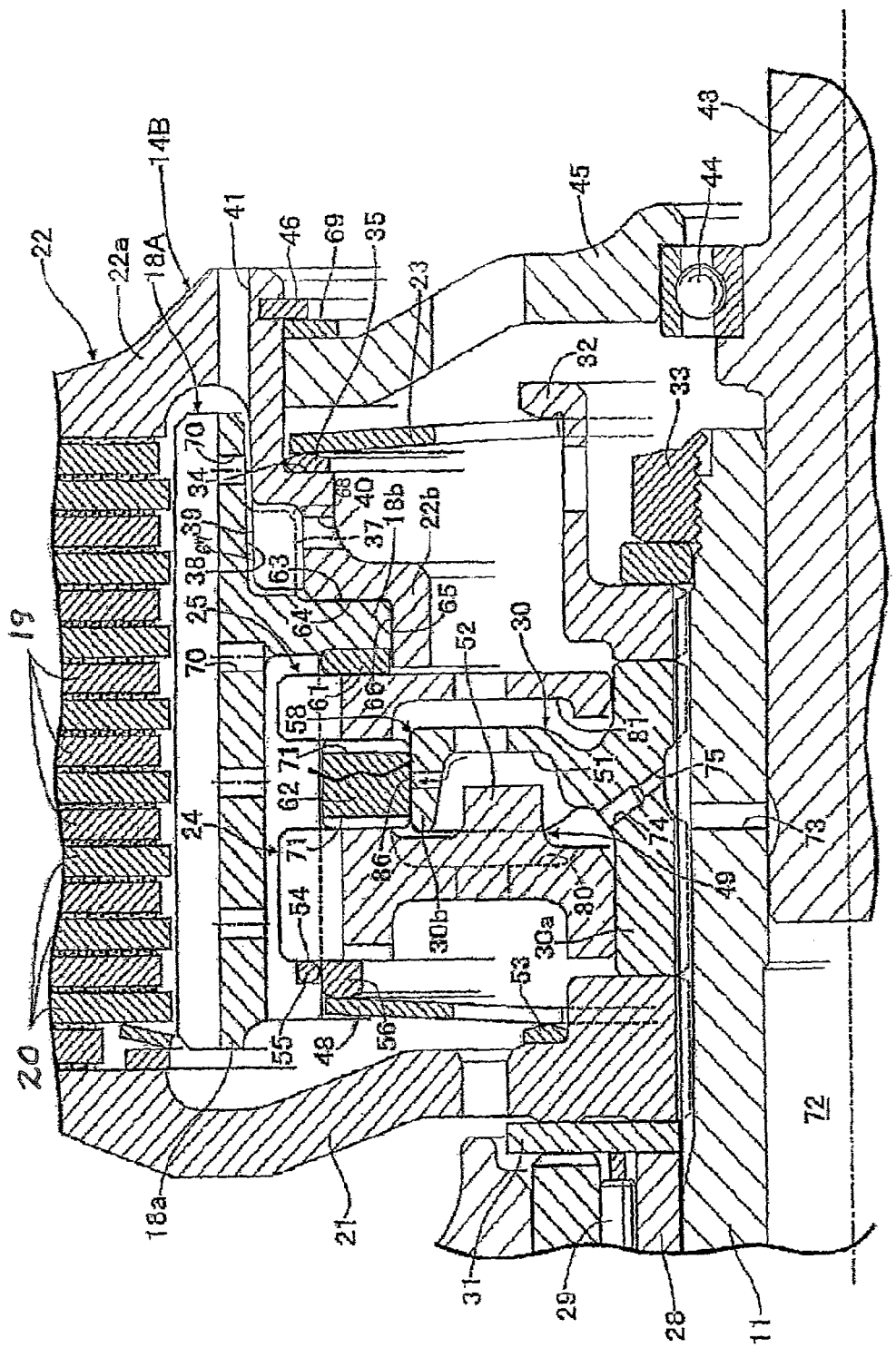
FIG. 6 is a longitudinal cross sectional view of a multi-plate clutch system according to Example 2, which corresponds to FIG. 2.

Referring to FIG. 6, descriptions will be provided for Embodiment 2 of the present invention. Parts corresponding to those of Example 1 will be only illustrated with the same reference numerals. Detailed descriptions for such parts will be omitted.

As through-holes connecting the inner surfaces to the outer surfaces of the first depressed cams 51, oil discharging passages 86 for discharging oil to the sliding-contact area between the inner periphery of the guide ring 62 and the outer periphery of the disc part 30b of the center cam plate 30 are formed in outer peripheral edge portions of the first depressed cams 51 provided in one surface of the disc part 30b of the center cam plate 30 which is common between the assist mechanism 24 and the slipper mechanism 25 included in this multi-plate clutch system 14B, respectively. In addition, similar oil discharging passages (not illustrated) are formed in outer peripheral edge portions of the second depressed cams 59 (see Example 1) provided in the other surface of the disc part 30b.

In Example 2, the oil discharging passages 86 are made in each of the first and second depressed cams 51, 59 by providing therein through-holes each connecting the inner surface and outer surface of the corresponding one of the outer peripheral edge portions of the first and second depressed cams 51, 59. For this reason, oil inside the first and second depressed cams 51, 59 can be securely supplied to the sliding-contact area between the inner periphery of the guide ring 62 and the outer periphery of the disc part 30b of the center cam plate 30 regardless of the heights of the peripheral edge portions of the first and second depressed cams 51, 59.

Example 3

Figure 7:
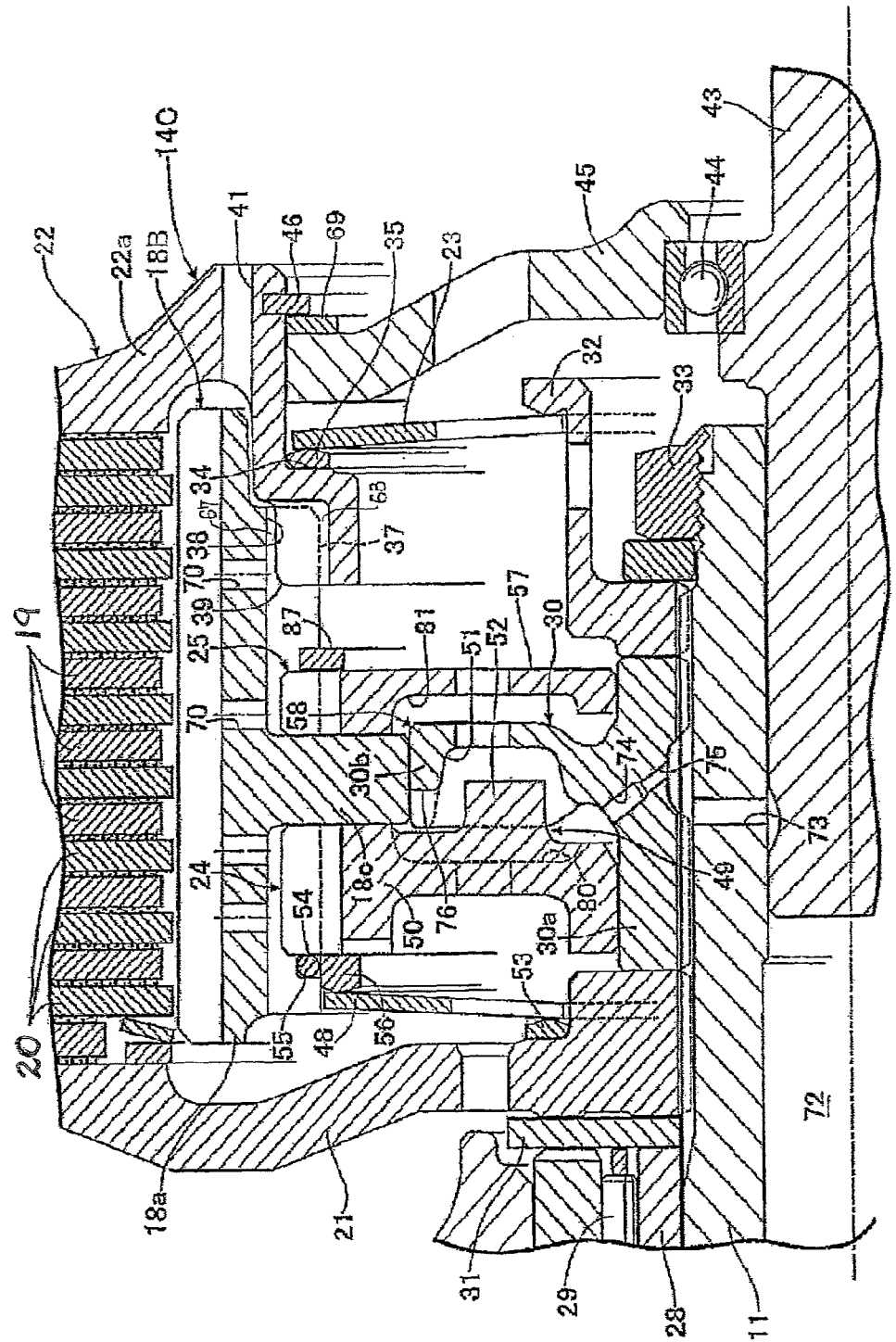
FIG. 7 is a longitudinal cross sectional view of a multi-plate clutch system according to Example 3, which corresponds to FIG. 2.

Referring to FIG. 7, descriptions will be provided for Embodiment 3 of the present invention. Parts corresponding to those of Examples 1 and 2 will be only illustrated with the same reference numerals. Detailed descriptions for such parts will be omitted.

A clutch inner 18B included in this multi-plate clutch system 14C unitarily includes: an engagement cylinder part 80a which engages the driven friction plates 20 with its outer periphery; and an annular middle wall 18c projecting inwards from an inner periphery of a middle portion of the engagement cylinder part 80a in the radial direction. An inner periphery of the annular middle wall 18c is in sliding contact with the outer periphery of the center cam plate 30 which is common between the assist mechanism 24 and the slipper mechanism 35.

In addition, the stop ring 55, 87 engaged with the assist cam plate 50 and slipper cam plate 57 from the opposite sides from the annular middle wall 18c are put on the assist cam plate 50 and the slipper cam plate 57 between which the annular middle wall 18c is interposed, respectively. Out of the two stop rings 55, 87, the stop ring 55 to whose inner periphery the bearing member 56 for receiving the spring 48 is placed contiguous is formed with a circular cross section. On the other hand, the other stop ring 87 is formed with a rectangular cross section.

In addition, the first and second depressed cams 51, 59 are provided in the two sides of the disc part 30b of the center cam plate 30 as in Example 1. Furthermore, the oil discharging passages 76, 77 for guiding oil to the sliding-contact area between the center cam plate 30 and the clutch inner 18B are provided in the oil discharging passages 76 provided in the outer peripheral edge portions of the depressed cams 51, 59, as in Example 1.

Example 3 can achieve the fixing structures for the assist cam plate 50 and the slipper cam plate 57 in a smaller size with low costs by used of the stop rings 55, 87 in such a way that: the annular middle wall 18c provided in the clutch inner 18B is interposed between the assist cam plate 50 and the slipper cam plate 57 which are opposed to the two sides of the center cam plate 30; the stop rings 55, 87 engaged with the assist cam plate 50 and the slipper cam plate 57 from the opposite sides from the annular middle wall 18c are attached to the clutch inner 18B; the stop ring 55 to whose inner periphery the bearing member 56 is placed contiguous is formed with the circular cross section, because the stop ring 55 is inhibited from deforming by being held by the bearing member 56; and the other stop ring 87 is formed with the rectangular cross section to prevent the stop ring 87 from coming off due to its deformation, and the rigidity of the stop ring 87 is accordingly increased.

Moreover, since the outer periphery of the center cam plate 30 is in sliding contact with the inner periphery of the annular middle wall 18c of the clutch inner 18B, it is possible to prevent the displacement of the axes of the clutch inner 18B and the center cam plate 30.

The alignment structure in which the inner peripheral surface of the clutch inner 18B is in sliding contact with and held by the center cam plate 30 enables oil, which is accumulated in the first and second depressed cams 51, 59 to be sufficiently supplied to the sliding-contact area between the center cam plate 30 and the clutch inner 18B in such a way that oil is guided to the sliding-contact area between the center cam plate 30 and the clutch inner 18B from the oil discharging passages 76, 77 provided in the outer peripheral edge portions of the first and second depressed cams 51, 59 which are made in the two sides of the disc part 30b of the center cam plate 30. Thereby, the alignment structure can enhance the lubricity.

The foregoing descriptions have been provided to the embodiment of the present invention. However, the present invention is not limited to the above-described embodiment. Various design changes can be applied to the embodiment of the present invention without departing from the present invention recited in the scopes of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-plate clutch system, comprising:
   a clutch outer connected to an input member;
   a clutch inner connected to an output member;
   a plurality of driving friction plates engaged with the clutch outer in such a way as to be movable in an axial direction and to be unrotatable relative to the clutch outer;
   a plurality of driven friction plates interleaved with the driving friction plates, said plurality of driven friction plates being engaged with the clutch inner in such a way as to be movable in the axial direction and to be unrotatable relative to the clutch inner;
   a pressure plate movable in the axial direction in order to cause the driving friction plates and the driven friction plates to frictionally engage with each other by bringing the driving friction plates and the driven friction plates into pressure contact with each other;
   a clutch spring for biasing the pressure plate in a direction in which the pressure plate brings the driving friction plates and the driven friction plates into pressure contact with each other; and
   an assist mechanism configured to increase a pressure-contact force of the pressure plate when acceleration torque is changed,
   wherein the clutch inner is movable in the axial direction of the output member and the pressure plate is a member different from the clutch inner, and the clutch inner and the pressure plate are connected together to be unrotatable relative to each other and to be capable of being separated from each other in the axial direction in such a way that, when the assist mechanism increases the pressure-contact force of the pressure plate, the pressure plate is moved in a direction to bring the driving friction plates and the driven friction plates into pressure contact with each other while the clutch inner is moved relative to the pressure plate in the same direction in such a way as to be detached from the pressure plate,
   wherein:
   the clutch inner includes an engagement cylinder part engaging the driven friction plates with an outer periphery of the engagement cylinder part thereof;
   an insertion cylinder part coaxially inserted in the engagement cylinder part is provided to the pressure plate;
   a plurality of groove forming projecting parts in which spline grooves are respectively formed are provided to one of an inner periphery of the engagement cylinder part and an outer periphery of the insertion cylinder part; and
   a plurality of spline projecting parts engaged with the respective spline grooves are provided to the other of the inner periphery of the engagement cylinder part and the outer periphery of the insertion cylinder part.

2. The multi-plate clutch system according to claim 1, wherein a slipper mechanism, configured to decrease the pressure-contact force produced by the pressure plate when deceleration torque is changed, is installed between the output member and the clutch inner in such a way that, while operating, the slipper mechanism moves the pressure plate in a direction in which the pressure plate decreases the pressure-contact force between the driving friction plates and the driven friction plates with the clutch inner being in intimate contact with the pressure plate.

3. The multi-plate clutch system according to claim 2, wherein the clutch inner and the pressure plate are provided with flat abutment parts extending along planes orthogonal to axes of the clutch inner and the pressure plate, respectively, in such a way that the flat abutment parts are in contact with each other when the clutch inner is brought into intimate contact with the pressure plate.

4. The multi-plate clutch system according to claim 3, wherein:
   a plurality of groove forming projecting parts in which spline grooves are respectively formed are provided to one of the clutch inner and the pressure plate;
   a plurality of spline projecting parts engaged with the respective spline grooves are provided to the other of the clutch inner and the pressure plate; and
   the abutment parts are provided in such a way as to be unitarily continuous to the groove forming projecting parts and the spline projecting parts to extend inward from the groove forming projecting parts and the spline projecting parts in a radial direction.

5. The multi-plate clutch system according to claim 3, wherein sliding-contact surfaces are respectively provided to the clutch inner and the pressure plate in such a way as to be in sliding contact with each other, the sliding-contact surfaces being continuous to inner ends of the two abutment parts extending in the radial directions of the clutch inner and the pressure plate, the sliding-contact surfaces each being formed in the shape of an arc about a center axis line of the clutch inner.

6. The multi-plate clutch system according to claim 5, wherein spaces are formed between the spline projecting parts and one of an inner periphery of an engagement cylinder part and an outer periphery of an insertion cylinder part, as well as between the groove forming projecting parts and the other of the inner periphery of the engagement cylinder part and the outer periphery of the insertion cylinder part, respectively.

7. The multi-plate clutch system according to claim 1, wherein the assist mechanism comprises:
   a spring configured to exert a spring force for biasing the clutch inner against a spring force of the clutch spring; and
   a cam mechanism configured to forcedly move the clutch inner against the biasing force of the spring to increase the pressure-contact force produced by the pressure plate when the acceleration torque is changed.

8. The multi-plate clutch system according to claim 1, wherein a first oil passage for guiding oil to an engagement area between the spline grooves and the spline projecting parts is provided in the pressure plate in such a way as to penetrate the insertion cylinder part in a radial direction.

9. The multi-plate clutch system according to claim 1, wherein a second oil passage for guiding oil to an engagement area between the spline grooves and the spline projecting parts is provided in the pressure plate in such a way as to penetrate the insertion cylinder part in the axial direction.

10. A multi-plate clutch system, comprising:
    a clutch outer, said clutch outer being connectable to an input member;
    a clutch inner, said clutch inner being connectable to an output member;

a plurality of driving friction plates mounted to the clutch outer;

a plurality of driven friction plates mounted to the clutch inner and being interleaved with the plurality of driving friction plates;

a pressure plate movable in the axial direction to cause the plurality of driving friction plates and the plurality of driven friction plates to be brought into pressure contact with each other;

a clutch spring for biasing the pressure plate in the axial direction to bring the plurality of driving friction plates and the plurality of driven friction plates into pressure contact with each other; and an assist mechanism configured to increase a pressure-contact force of the pressure plate when acceleration torque is changed, wherein the clutch inner and the pressure plate are capable of being separated from each other in the axial direction in such a way that, when the assist mechanism increases the pressure-contact force of the pressure plate, the pressure plate is moved in a direction to bring the plurality of driving friction plates and the plurality of driven friction plates into pressure contact with each other while the clutch inner is moved relative to the pressure plate in the same direction in such a way as to be detached from the pressure plate, wherein a slipper mechanism, configured to decrease the pressure-contact force produced by the pressure plate when deceleration torque is changed, is installed between the output member and the clutch inner in such a way that, while operating, the slipper mechanism moves the pressure plate in a direction in which the pressure plate decreases the pressure-contact force between the driving friction plates and the driven friction plates with the clutch inner being in intimate contact with the pressure plate, wherein the clutch inner and the pressure plate are provided with flat abutment parts extending along planes orthogonal to axes of the clutch inner and the pressure plate, respectively, in such a way that the flat abutment parts are in contact with each other when the clutch inner is brought into intimate contact with the pressure plate.

11. The multi-plate clutch system according to claim 10, wherein the assist mechanism comprises:

a spring configured to exert a spring force for biasing the clutch inner against a spring force of the clutch spring; and a cam mechanism configured to forcedly move the clutch inner against the biasing force of the spring to increase the pressure-contact force produced by the pressure plate when the acceleration torque is changed.

12. The multi-plate clutch system according to claim 10, wherein:

the clutch inner includes an engagement cylinder part engaging the driven friction plates with an outer periphery of the engagement cylinder part thereof;

an insertion cylinder part coaxially inserted in the engagement cylinder part is provided to the pressure plate;

a plurality of groove forming projecting parts in which spline grooves are respectively formed are provided to one of an inner periphery of the engagement cylinder part and an outer periphery of the insertion cylinder part; and a plurality of spline projecting parts engaged with the respective spline grooves are provided to the other of the inner periphery of the engagement cylinder part and the outer periphery of the insertion cylinder part.

13. The multi-plate clutch system according to claim 12, wherein a first oil passage for guiding oil to an engagement area between the spline grooves and the spline projecting parts is provided in the pressure plate in such a way as to penetrate the insertion cylinder part in a radial direction.

14. The multi-plate clutch system according to claim 12, wherein a second oil passage for guiding oil to an engagement area between the spline grooves and the spline projecting parts is provided in the pressure plate in such a way as to penetrate the insertion cylinder part in the axial direction.

15. The multi-plate clutch system according to claim 10, wherein:

a plurality of groove forming projecting parts in which spline grooves are respectively formed are provided to one of the clutch inner and the pressure plate;

a plurality of spline projecting parts engaged with the respective spline grooves are provided to the other of the clutch inner and the pressure plate; and the abutment parts are provided in such a way as to be unitarily continuous to the groove forming projecting parts and the spline projecting parts to extend inward from the groove forming projecting parts and the spline projecting parts in a radial direction.

16. The multi-plate clutch system according to claim 10, wherein sliding-contact surfaces are respectively provided to the clutch inner and the pressure plate in such a way as to be in sliding contact with each other, the sliding-contact surfaces being continuous to inner ends of the two abutment parts extending in the radial directions of the clutch inner and the pressure plate, the sliding-contact surfaces each being formed in the shape of an arc about a center axis line of the clutch inner.

17. The multi-plate clutch system according to claim 16, wherein spaces are formed between the spline projecting parts and one of an inner periphery of an engagement cylinder part and an outer periphery of an insertion cylinder part, as well as between the groove forming projecting parts and the other of the inner periphery of the engagement cylinder part and the outer periphery of the insertion cylinder part, respectively.

* * * * *